United States Patent
Sharpe et al.

(10) Patent No.: US 9,622,941 B2
(45) Date of Patent: Apr. 18, 2017

(54) VIAL HOLDER AND METHOD OF USE

(71) Applicants: Gary L. Sharpe, Naples, FL (US); Brian Dutro, Columbus, OH (US)

(72) Inventors: Gary L. Sharpe, Naples, FL (US); Brian Dutro, Columbus, OH (US)

(73) Assignee: Gary L. Sharpe, Naples, FL (US)

( * ) Notice: Subject to any disclaimer, the term of this patent is extended or adjusted under 35 U.S.C. 154(b) by 0 days.

(21) Appl. No.: 14/067,251

(22) Filed: Oct. 30, 2013

(65) Prior Publication Data
US 2014/0117184 A1    May 1, 2014

Related U.S. Application Data

(60) Provisional application No. 61/720,200, filed on Oct. 30, 2012.

(51) Int. Cl.

| | |
|---|---|
| A47B 96/06 | (2006.01) |
| A47G 29/00 | (2006.01) |
| A47K 1/00 | (2006.01) |
| E04G 3/00 | (2006.01) |
| E04G 5/06 | (2006.01) |
| F21V 21/00 | (2006.01) |
| F21V 35/00 | (2006.01) |
| A61J 1/16 | (2006.01) |
| B01L 9/06 | (2006.01) |
| F16L 3/22 | (2006.01) |
| F16L 3/08 | (2006.01) |
| F16L 3/12 | (2006.01) |

(Continued)

(52) U.S. Cl.
CPC . *A61J 1/16* (2013.01); *B01L 9/06* (2013.01); *A47B 73/00* (2013.01); *A47B 73/004* (2013.01); *A47F 7/28* (2013.01); *A47F 7/286* (2013.01); *B01L 9/50* (2013.01); *B01L 2200/023* (2013.01); *F16M 11/00* (2013.01); *F16M 11/04* (2013.01); *F16M 11/041* (2013.01)

(58) Field of Classification Search
CPC ..... F16B 2/10; F16L 3/24; F16L 3/137; F16L 3/127; F16L 3/04; F16L 3/12; F16L 55/035; F16M 13/00; F16M 11/041; F16M 13/022; F16M 13/02; F16M 11/10; H02G 3/32; B01L 9/16; A47B 73/00; A47B 73/004; A47B 73/008; A47F 7/28; A47F 7/283; A47F 7/285; A47F 7/286
USPC .... 248/316.1, 316.6, 316.7, 176.1, 65, 68.1, 248/73, 74.1, 74.2, 74.4; 606/54–59, 606/227–233; 211/85.18, 85.13, 74, 70.6; 422/297
See application file for complete search history.

(56) References Cited

U.S. PATENT DOCUMENTS 2,206,728 A * 7/1940 Nevins, Jr. .............. 211/73
2,371,433 A * 3/1945 Davis ................. 211/70.6

(Continued)

FOREIGN PATENT DOCUMENTS

EP 254487 A2 * 1/1988 ............ A61J 1/00

*Primary Examiner* — Brian Mattei
*Assistant Examiner* — Taylor Morris
(74) *Attorney, Agent, or Firm* — Standley Law Group LLP; Jeffrey Standley; Matthew Schonauer

(57) ABSTRACT

A customizable holder for vials and test tubes is described herein. The holder includes a body having an inclined portion and a vertical portion joined together. A guide is present in the inclined portion for accepting elastic clamps for holding a vial or test tube. The elastic clamps have a slot and aperture therein to retain a vial or test tube.

18 Claims, 8 Drawing Sheets

(51) Int. Cl.
*A47G 1/10* (2006.01)
*A47F 7/00* (2006.01)
*A47B 73/00* (2006.01)
*A61L 2/00* (2006.01)
*A61L 9/00* (2006.01)
*A47F 7/28* (2006.01)
*F16M 11/00* (2006.01)
*F16M 11/04* (2006.01)
*B01L 9/00* (2006.01)

(56) References Cited

U.S. PATENT DOCUMENTS

| | | | |
|---|---|---|---|
| 2,542,442 A | 2/1951 | Weber | |
| 2,676,680 A * | 4/1954 | Kindorf | 403/22 |
| 2,913,740 A | 11/1959 | Eldridge | |
| 3,210,816 A | 10/1965 | Clemons | |
| 3,288,137 A | 11/1966 | Lund | |
| 3,482,709 A * | 12/1969 | Larson | A47F 5/0815 211/187 |
| D220,606 S | 4/1971 | Larson et al. | |
| 3,751,172 A * | 8/1973 | Seitz et al. | 356/244 |
| 3,812,976 A * | 5/1974 | Rempel | 211/70.6 |
| 3,837,633 A | 9/1974 | Paulsen | |
| 4,453,639 A * | 6/1984 | Sharma | 211/74 |
| 4,474,056 A * | 10/1984 | O'Brien et al. | 73/61.69 |
| 4,606,735 A | 8/1986 | Wilder et al. | |
| 4,947,996 A * | 8/1990 | Harris | 211/50 |
| 5,133,454 A | 7/1992 | Hammer | |
| 5,224,674 A | 7/1993 | Simons | |
| 5,279,578 A | 1/1994 | Cooke | |
| 5,927,660 A * | 7/1999 | McNerney et al. | 248/95 |
| 6,003,686 A * | 12/1999 | Pichler | B41K 1/58 211/175 |
| 6,082,544 A * | 7/2000 | Romick | 206/531 |
| 6,193,932 B1 * | 2/2001 | Wu et al. | 422/28 |
| 6,257,408 B1 | 7/2001 | Odierno | |
| 6,474,482 B2 | 11/2002 | Manix | |
| 6,561,464 B2 * | 5/2003 | Cumby | 248/27.8 |
| 6,808,149 B1 * | 10/2004 | Sendowski et al. | 248/311.3 |
| 7,540,456 B2 | 6/2009 | Thompson | |
| 7,744,572 B2 | 6/2010 | Bierman | |
| D702,832 S | 4/2014 | Hadley | |
| 2010/0133397 A1 * | 6/2010 | Hu | 248/176.1 |

* cited by examiner

VIAL HOLDER AND METHOD OF USE

CROSS-REFERENCE TO RELATED APPLICATIONS

This application claims priority to U.S. Provisional Application No. 61/720,200 and incorporates said application by reference as is fully rewritten herein.

TECHNICAL FIELD

The present invention relates to an apparatus for holding and supporting a vial, test tube or other containers.

BACKGROUND OF THE ART

A side effect of the ever increasing number of medications in the hospital and clinical settings is the increased need for additional storage space. More concerning however, is that the increase in the number of medications also increases the likelihood of medication errors occurring. Hospitals are becoming increasingly aware that errors in medication are occurring as a result of poor storage solutions.

It is estimated that between about 40,000 and 100,000 individuals die in hospitals each year as a result of preventable errors. The number-one case of adverse and preventable patient events is medication error which leads to an estimated 7,000 deaths annually. According to insurers, medication error is the most frequent cause of procedural related malpractice claims. Commonly these mistakes are made when two products have similar packaging and one drug is mistaken for the other. Medication errors may also occur when similarly packaged vials contain the same medicine, but have different concentrations.

Another problem associated with multi-dose vials is the transmission of infections. While many vials contain antibacterial preservatives, many do not contain antiviral agents. Adding to the problem can be faulty aseptic techniques adding to the contamination rate of the vials. Studies have revealed that the contamination rate may reach as high as 27%. The current storage devices used in the hospital and clinical setting are not addressing these concerns.

Traditional vial storage devices may attempt to save as much space as possible and store the vials in a manner that renders the vial packaging and label hidden. Obscuring portions of the vial label could possibly lead to an increase occurrence of medication error. Especially in an emergency room setting where timely treatment is so important having vial labels or portions thereof hidden may lead to a health care provider administering the incorrect medication and possible causing harm to the patient.

In addition, traditional vial storage devices position the vials where it is necessary to touch the top portion of the vial for removal from the storage device. The necessity to touch the area where the syringe interfaces with the vial could lead to the transmission of infections if aseptic techniques are not followed.

Another problem with traditional vial storage devices is the need for secondary labeling. The secondary labeling is typically needed as vial labels are hidden from view in the storage device. The use of secondary labeling results in health care providers using the secondary labels for identification instead of following the correct procedure of reading the label on the vial. This use of the secondary labeling for identification purposes results in an increase in medication errors.

Accordingly, being able to effectively store vials and other containers in a manner that can minimize medication errors and infection transmission is an ongoing challenge in the industry. Consequently, there is a need for a vial holder providing a storage system that can assist in the elimination of these medication errors and reduce the risk of infection transmission by properly positioning the vials.

SUMMARY OF THE INVENTION

Accordingly, exemplary embodiments of the present invention have been made to remedy the previous mentioned problems. One objective of the exemplary embodiments is to provide storage for a variety of vial sizes as well as test tubes and a variety of other containers. In the exemplary embodiments, the vials are stored so that a care provider or other user can make a clear visual inspection of the vial's labels and contents. This ability to clearly see the vial's labels eliminates the need for secondary labeling reducing the risk of medication errors. In addition, the positioning of the vials or other containers eliminates the need to touch or contact the top portions of the containers thus reducing the possibility of the transmission of infection.

The vial holder may be used in a variety of ways including insertion into a tray unit, simply resting on a surface, or attached to a wall or other surface. The vial holder may also accommodate a variety of containers shapes and sizes allowing for customization based on the needs of the healthcare provider. The customization of the vial holder also allows for the addition of color coding further reducing the risk of medication error.

Exemplary embodiments provide for a vial holder. The vial holder includes a body and readily attachable clamps that are used to secure containers such as vials and test tubes. The body has an inclined surface against which the container may rest. A vertical piece is also provided and intersects with the inclined surface. The vertical piece may have tabs to allow the vial holder to be inserted into a tray unit or other similar slotted device.

A guide is present in the inclined surface near the intersection of the inclined surface and the vertical piece. The guide allows for the insertion of the clamps for holding the containers. A portion of the clamp is inserted into and through the guide and the remainder of the clamps protrudes from the inclined surface. The portion of the clamp extending from the inclined surface has a slot therein terminating in a circular aperture. The container to be held can then be inserted into the slot and come to rest in the circular aperture.

BRIEF DESCRIPTION OF THE DRAWINGS

The advantages and other characteristics of the disclosed embodiments will be better understood when attention is directed to the accompanying drawings, wherein identical elements are identified with identical reference numerals and wherein.

DETAILED DESCRIPTION OF THE EXEMPLARY EMBODIMENTS

Exemplary embodiments of the present invention will now be described in greater detail. It should be recognized that the present invention can be practiced in a wide range of other embodiments besides those explicitly described, and the scope of the exemplary embodiments described are expressly not limited.

Figure 1:
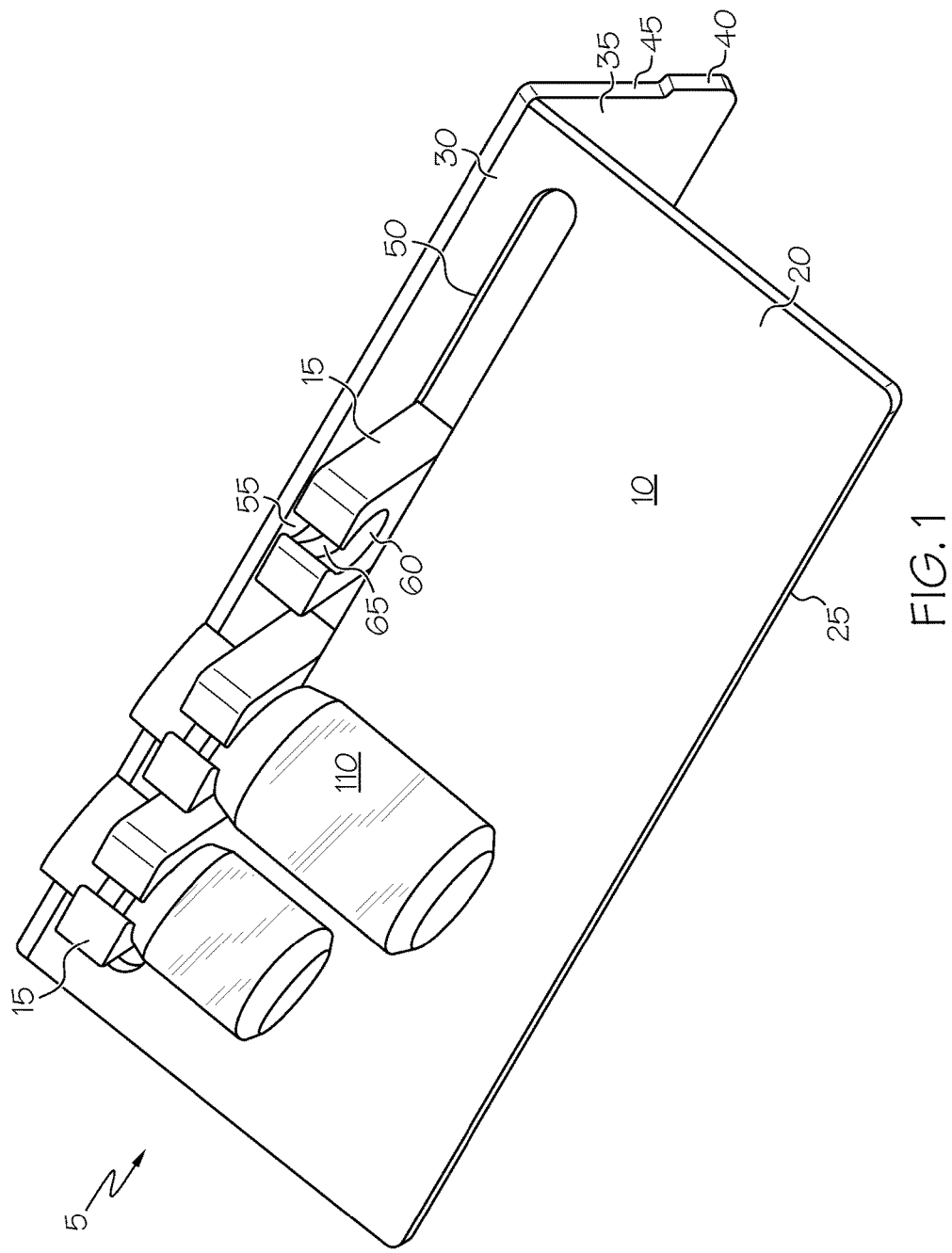
FIG. 1 is a top perspective view of an exemplary embodiment of a vial holder according to the inventive concept shown retaining vials.
Figure 2:
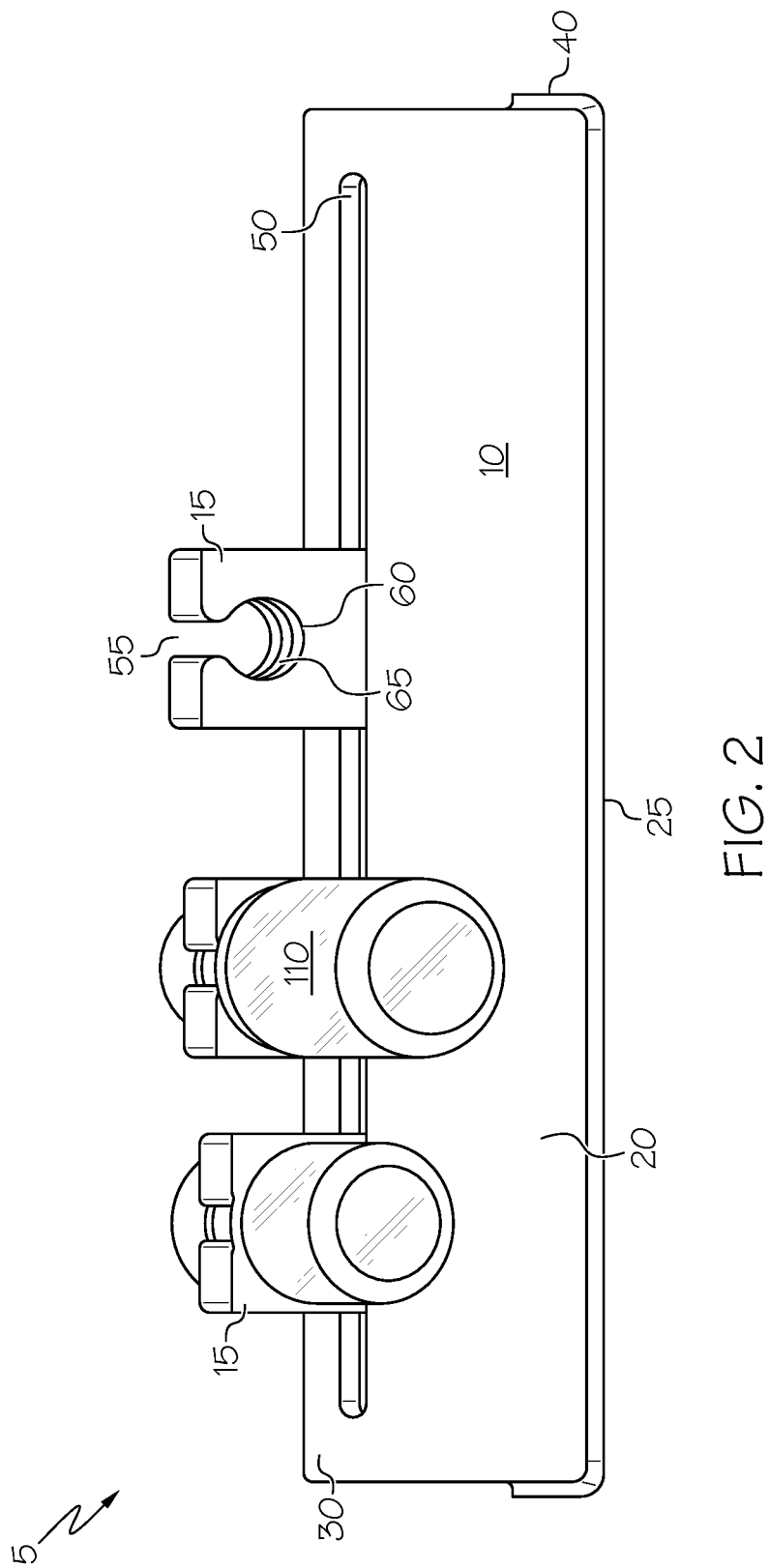
FIG. 2 is a front view of the exemplary vial holder from FIG. 1 showing an empty clamp inserted into a guide.
Figure 3:
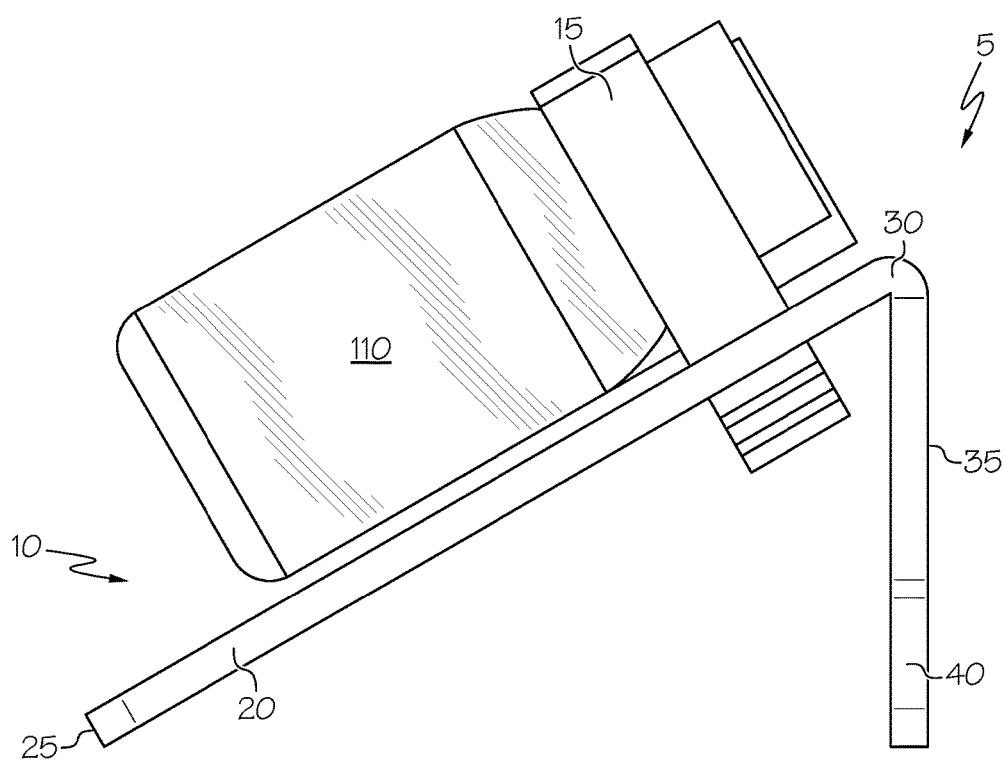
FIG. 3 is a side view of the exemplary vial holder in FIG. 1.
Figure 4:
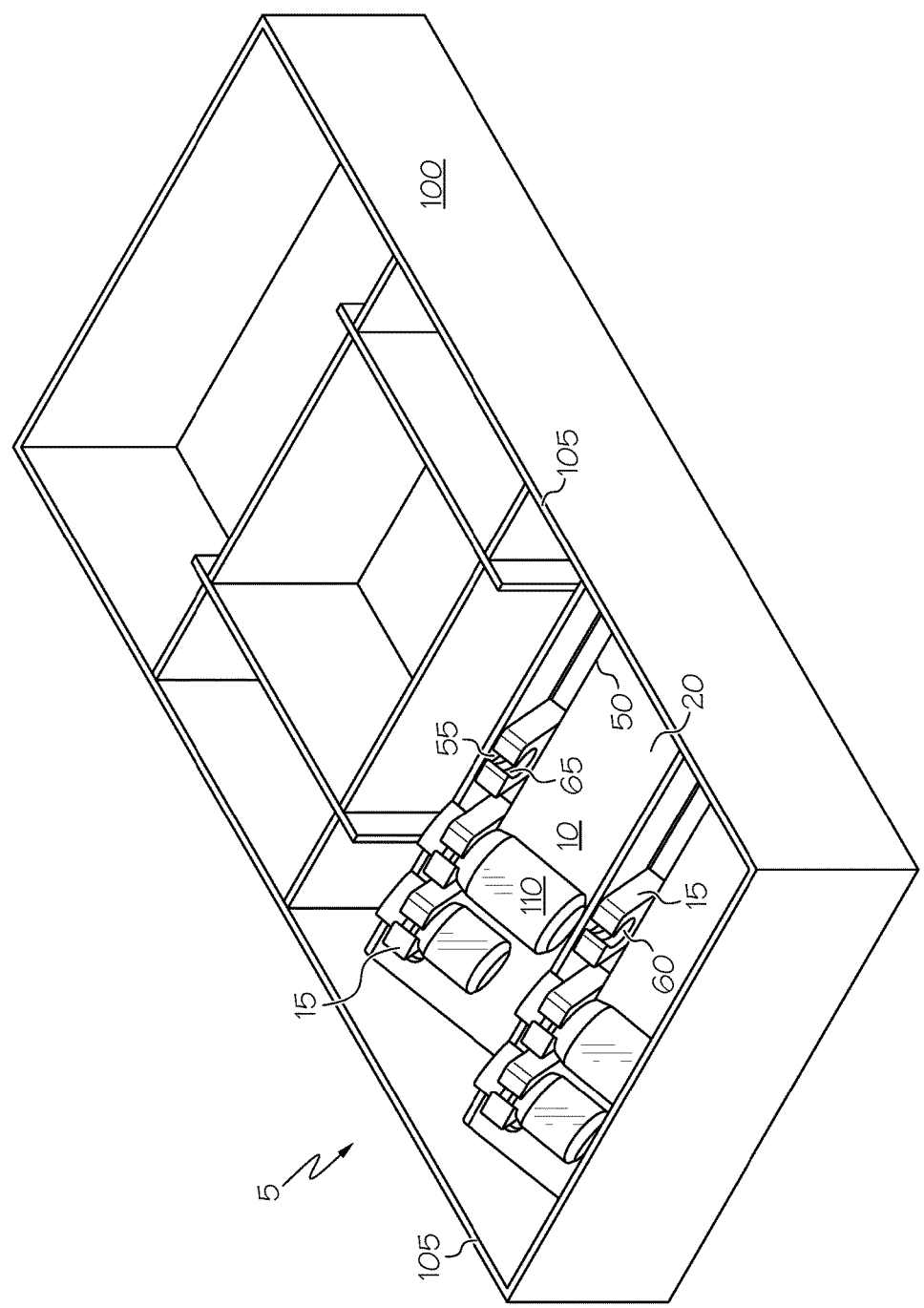
FIG. 4 is a top perspective view of the two exemplary vial holders of FIG. 1 installed in a tray unit.

Directing attention to the drawings and particularly to FIGS. 1-3, a perspective view is provided for an embodiment of a vial holder 5 that may be used independently or in conjunction with a tray unit 100 (shown in FIG. 4). As illustrated, the exemplary vial holder 5 is primarily constructed from two types of pieces, the first of which is an inclined body 10 and the second type of piece which is a clamp 15. In the assembled configuration in FIG. 1, the exemplary vial holder 5 is capable of storing vials, test tubes, or other similar containers. It is understood that the inclined body 10 may be made from a variety of different materials that are capable of being disinfected and/or sterilized. One exemplary embodiment provides that the body 10 is made from polystyrene. The clamps 15 are made from an elastic material such as silicone or any suitable hydrocarbon gel material.

The body 10 has an inclined surface 20 having a generally rectangular perimeter. As illustrated in FIG. 1, the rectangular perimeter of the inclined surface 20 defines a bottom portion 25 and a top portion 30. The top portion 30 intersects with a vertical surface 35. The vertical surface 35 extends from the intersection with the top portion 30 of the inclined surface 20 creating an acute angle between the inclined surface 20 and the vertical surface 35. As with the inclined surface 20, the vertical surface 35 has a substantially rectangular perimeter. In order to secure some exemplary embodiments of the device 5 into a tray unit 100 (shown in FIG. 4) the vertical surface 35 may have tabs 40 located on the side edges 45 of the vertical surface 35. The tabs 40 are inserted into channels 105 in the tray unit 100 to correctly position and stabilize the device 5.

Furthermore, the inclined body 10 includes a guide 50 or slot running nearly the entire length of the inclined surface 20. The guide 50 is defined by the inclined surface 20 and is substantially parallel to the bottom and top portions 25, 30. Although shown with rounded ends it should be understood that the guide 50 may have a variety of dimensions and shapes.

The second type of piece that makes up the device is the clamp 15. As shown in FIG. 1, the device 5 may have a plurality of clamps 15 inserted into the guide 50. The clamps 15 have a substantially rectangular shape and a thickness allowing for insertion into the guide 50. A slot 55 is present on one side of the clamp 15 and extends towards the interior of the clamp 15 and terminates at an aperture 60 therein. The aperture 60 may be circular and have a diameter larger than the dimensional width of the slot 55. The circular shape of the aperture 60 allows the clamp 15 to secure and hold a vial 110, test tube, or other container. In some embodiments, a ridge 65 may be present in both the aperture 60 and the slot 55. The ridge 65 extends from the walls of both the aperture 60 and the slot 55, and has a smaller diameter than the aperture 60 and a decreased width versus the slot 55. This ridge 65 allows the clamp 15 to form a more complementary engagement with the vials 110 to be held therein. The clamp 15 may be molded from an elastic material, such as silicone or hydrocarbons having the ability to form an elastic material suitable to support a vial 110.

Figure 5:
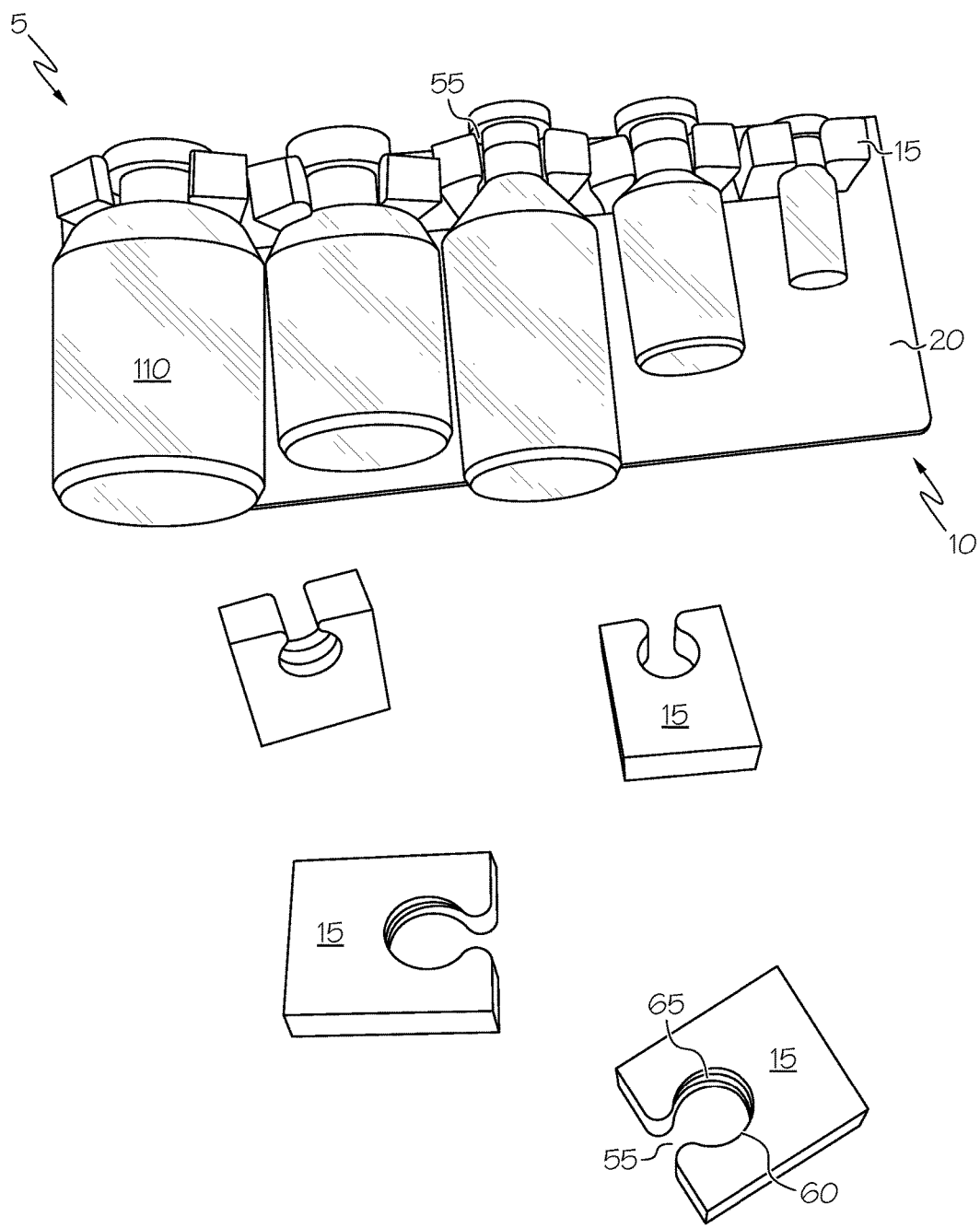
FIG. 5 is another exemplary embodiment of a vial holder according to the inventive concept including a number of additional clamps.
Figure 7:
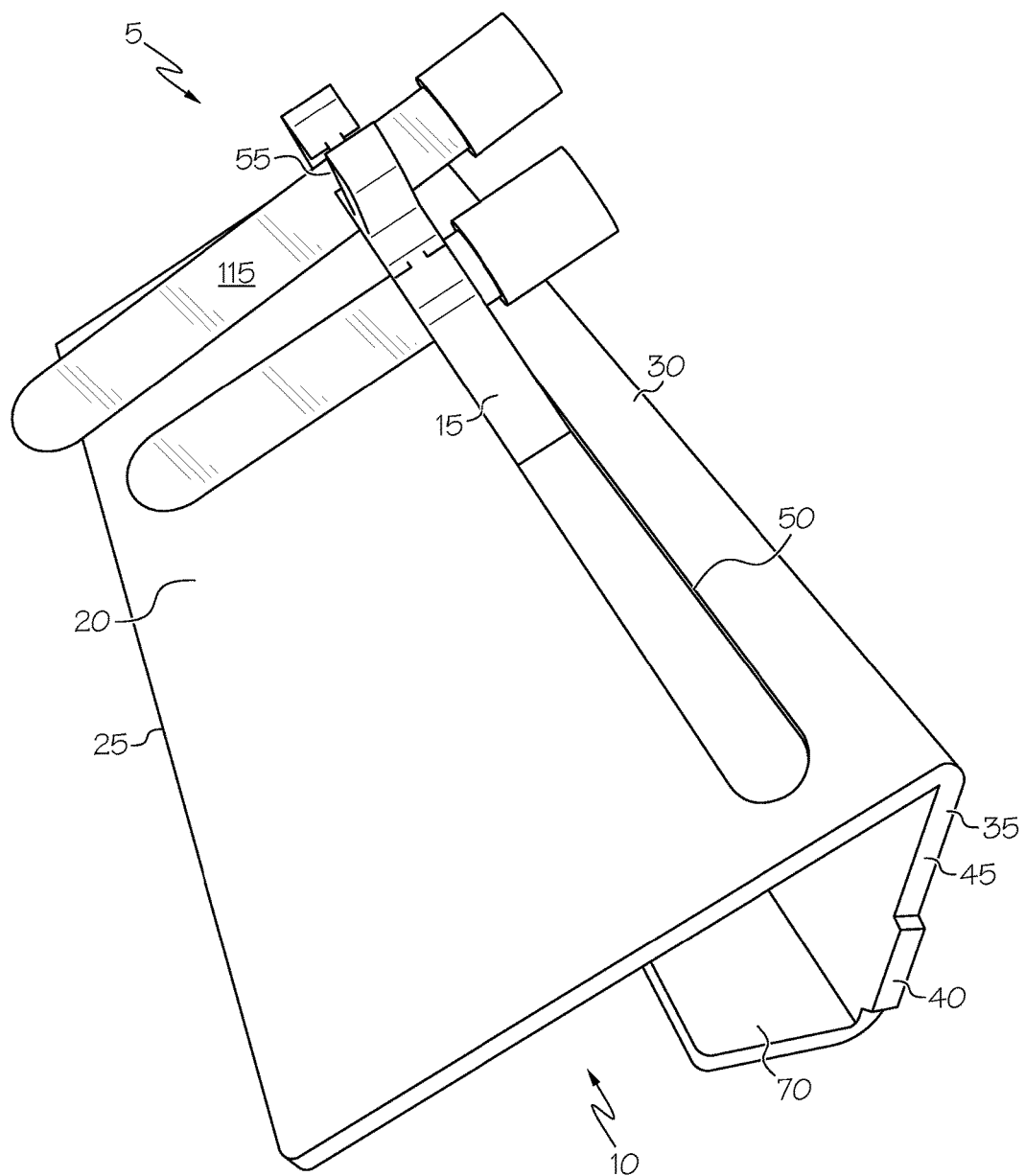
FIG. 7 is a another side perspective view of the exemplary vial holder shown in FIG. 5 wherein a number of test tubes are held.
Figure 8:
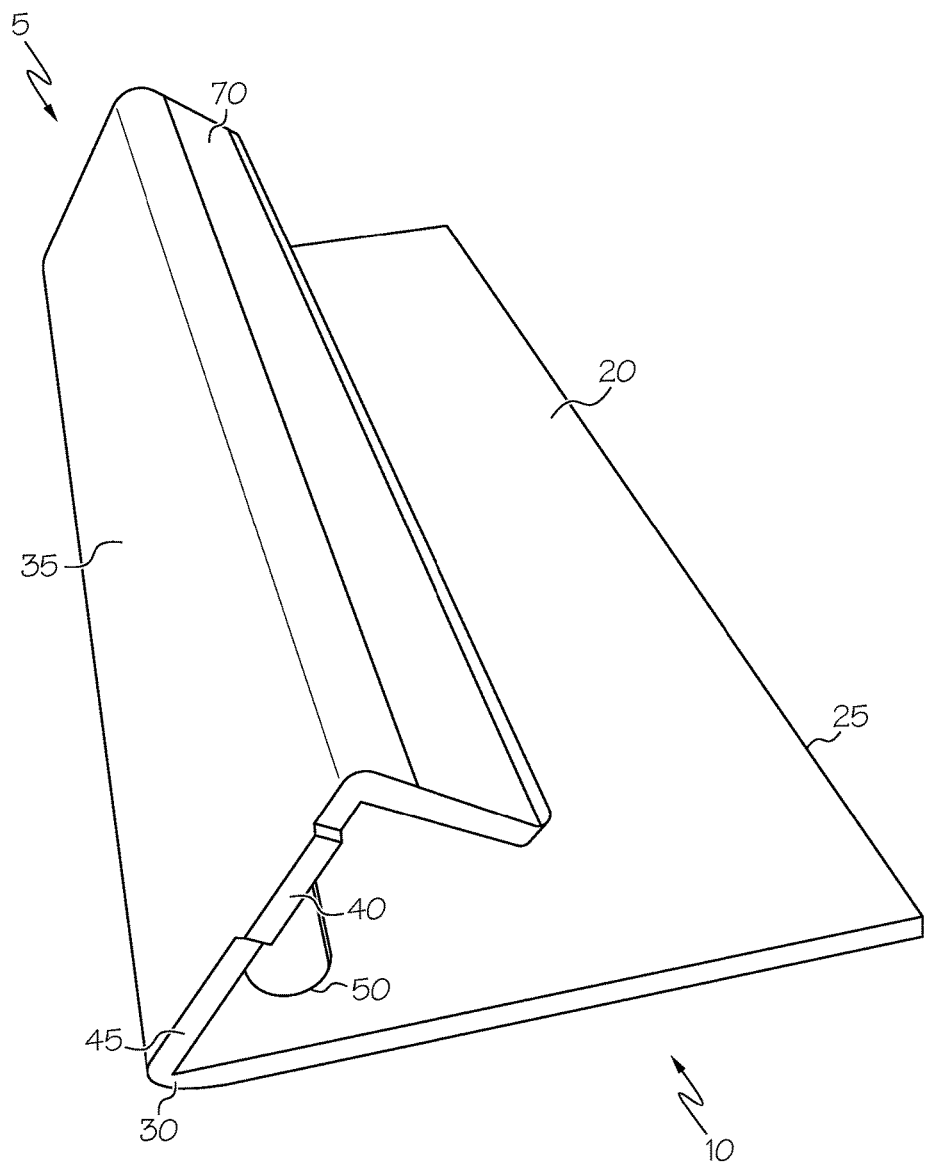
FIG. 8 is a back perspective view of the exemplary vial holder shown in FIG. 5 illustrating the bottom surface.

To affix the clamps 15 to the inclined body 10, the portion of the clamp 15 opposite the slot 60 is inserted into the guide 50. The elastic body of the clamp 15 allows for a snug fit between the clamp 15 and the guide 50 ensuring that proper placement will be maintained. The use of the guide 50 and the clamps 15 allows for a variety of configurations to be accomplished. This allows the device 5 to accommodate a variety of vial 110 sizes and to allow health care providers a level of customization. As illustrated in FIG. 5, clamps 15 may be formed in a variety of sizes to accommodate the variety in vials 110 and test tubes 115 (shown in FIG. 7).

As shown in FIG. 4, the device 5 may be inserted into a tray unit 100. To insert the device 5 into the tray unit 100 the tabs 40 are aligned with the channels 105 in the tray unit 100. Once aligned the tabs 40 are nested in the channels 105, and the entire device 5 is lowered until the device 5 rests against the bottom of the tray unit 100. As discussed herein, this type of organization may assist in the prevention of medication errors, but allowing customized medication trays.

Figure 6:
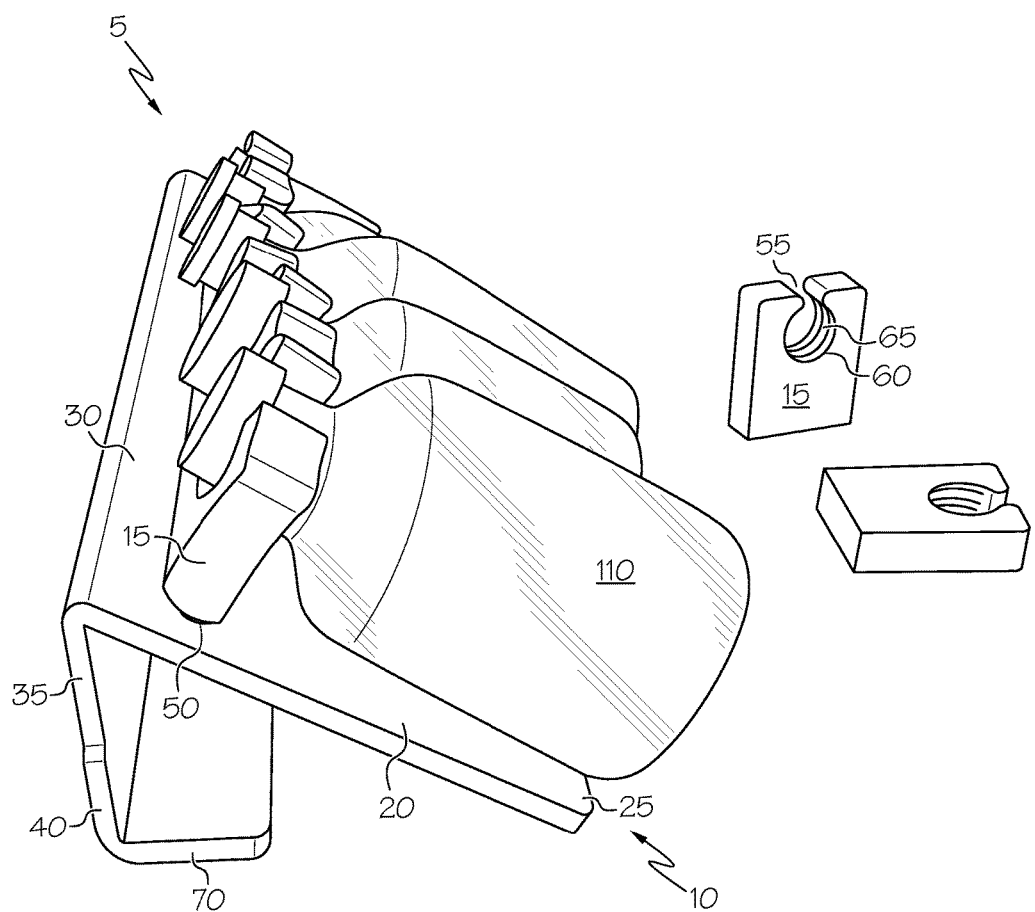
FIG. 6 is a side perspective view of the exemplary vial holder shown in FIG. 5.

Now directing attention to FIGS. 5-8, another exemplary embodiment of the device 5 is shown. The device is similar in many respects and includes an inclined body 10 and clamps 15. As with the other exemplary embodiments, the inclined body 10 has an inclined surface 20 and a vertical surface 25. However, this embodiment has an additional bottom surface 70. The bottom surface 70 extends from the vertical surface 25 opposite the inclined surface 20. The bottom surface 70 may provide support as shown in FIG. 6.

The bottom surface 70 may also be used to affix the device 5 to a wall or other surface. In this embodiment, adhesive may be placed on the bottom surface 70 to adhere the device 5 to a wall or other support. In still other embodiments, mechanical fasteners may be used to attach the bottom surface 70 to a wall to support the device 5.

In either embodiment, a user determines the arrangement of vials 110 or test tubes 115 to be held in the vial holder 5. The clamps 15 are then inserted into the guide 50. After the clamps 15 are secured within the guide 50, the vials 110 or test tubes 115 are placed in the clamps 15. The inclined surface 20 allows the vials 110 and test tubes 115 to rest at an angle so that the labels are clearly visible whether the vial holder 5 is used with a tray unit 100, attached to a wall or other surface, or simply resting on a surface. In addition, the inclined arrangement allows for the removal and insertion of the vials 110 and test tubes 115 without the need to touch the area accessed by a syringe. By allowing a user to grasp the labeled portion of the container, the spread of infection may be reduced.

The customizable feature of the vial holder 5 also allows for color coordination of the clamps 15. In some embodiments, the clamps 15 may have different colors signifying different types or classes of medication. This added level of visual notification may also help reduce the risk of medication error.

While the embodiments disclosed described the best modes known to the inventor at the time of filing, the scope of the invention is not to be limited to only the embodiments disclosed herein.

What is claimed is:

1. A container holder, comprising:
   a body having an inclined surface intersecting with a vertical surface at a top portion of said inclined surface, said inclined surface defined by a perimeter;
   a guide located in said inclined surface within said perimeter, said guide parallel to and spanning most of said top portion of said inclined surface;
   a plurality of clamps, said clamps molded from an elastic material;
   a slot in each of said clamps, said slot extending inward from an edge of said clamps and terminating at an aperture in said clamps; and
   a ridge in said slot and said aperture, said ridge adapted for complementary engagement with a vial to be held in said clamps,
   wherein a rectangular second edge opposite of said first edge of each of said plurality of clamps is inserted into said guide in said inclined surface.

2. The container holder of claim 1, further comprising a bottom surface extending horizontally from said vertical surface opposite the intersection with said inclined surface.

3. The container holder of claim 1, further comprising tabs extending from opposing side edges of, and coplanar to, said vertical member.

4. The container holder of claim 3, further comprising a unit tray, said unit tray having a rectangular body and vertical channels therein, said channels nesting said tabs therein when said body is positioned within said unit tray.

5. A container holder, comprising:
   an inclined member, said inclined member having a rectangular perimeter defining a top portion and a bottom portion;
   a vertical member having a rectangular perimeter, said vertical member intersecting said inclined member at said top portion of said inclined member at an acute angle, wherein said inclined member and said vertical member form a body of said vial holder;
   a guide located proximate to the top portion of said inclined member and within said rectangular perimeter, said guide running parallel to said top portion of said inclined member;
   at least one clamp molded from an elastic material, said clamp having a rectangular perimeter and a thickness allowing for insertion into said guide;
   a slot extending from a first edge of said clamp and terminating at an aperture therein; and
   a ridge positioned along the interior of said slot and said aperture,
   wherein a second rectangular edge of said clamp opposite of said first edge is inserted into said guide for retention of said clamp therein such that a container retained in said clamp is positioned on an incline similar to that of the inclined member.

6. The container holder of claim 5, further comprising tabs extending from opposing side edges of said vertical member and coplanar to said rectangular perimeter of said vertical member.

7. The container holder of claim 6, further comprising a tray, said tray having channels therein for receiving said tabs on said vertical member.

8. The container holder of claim 5, further comprising a bottom member, said bottom member having a rectangular perimeter and extends from said vertical member opposite said inclined member.

9. The container holder of claim 8, wherein said bottom member allows attachment of said body to a supporting surface.

10. The container holder of claim 5, wherein said body is formed from a single piece of rigid material.

11. The container holder of claim 5, wherein said slot expands to receive a vial or test tube to be retained therein.

12. The container holder of claim 11, wherein said clamp applies pressure to said vial or test tube for retention therein.

13. A method of removably storing a container on an incline, comprising:
   providing the container holder of claim 1;
   inserting said rectangular second edge of one of said plurality of clamps into said guide in said inclined surface such that said slot and aperture in said one of said plurality of clamps remain exposed; and
   passing said container through said slot and into said aperture of said one of said plurality of clamps, whereby said container engages said ridge of said one of said plurality of clamps.

14. The method of claim 13, further comprising providing a tray having channels therein.

15. The method of claim 14, further comprising placing said body into said tray by nesting tabs on said vertical member in said channels of said tray.

16. The method of claim 13, wherein said vertical surface has a bottom surface extending horizontally from said vertical surface opposite the intersection with said inclined surface.

17. The method of claim 16, further comprising attaching said body to a supporting surface using said bottom surface whereby said inclined surface is angled relative to said supporting surface.

18. The method of claim 13, further comprising positioning said container retained in said one of said plurality of clamps such that a label present on said container is visible.

* * * * *